(12) United States Patent
Sekimoto et al.

(10) Patent No.: US 7,383,192 B2
(45) Date of Patent: Jun. 3, 2008

(54) METHOD FOR DISPLAYING PRODUCT VALUE CHAIN FLOW DIAGRAM AND PRODUCT VALUE CHAIN DATA

(75) Inventors: Shinya Sekimoto, Tokyo (JP); Hiroshi Yamazaki, Kanagawa-ken (JP); Kyoko Suzuki, Tokyo (JP); Kosuke Ishii, Tokyo (JP)

(73) Assignees: Kabushiki Kaisha Toshiba, Tokyo (JP); The Board of Trustees of the Leland Stanford Junior University, Palo Alto, CA (US)

( * ) Notice: Subject to any disclaimer, the term of this patent is extended or adjusted under 35 U.S.C. 154(b) by 937 days.

(21) Appl. No.: 09/953,293

(22) Filed: Sep. 17, 2001

(65) Prior Publication Data

US 2003/0055661 A1    Mar. 20, 2003

(51) Int. Cl.
*G06Q 99/00*    (2006.01)
(52) U.S. Cl. .............................. 705/1; 705/8; 715/743; 715/764; 700/83
(58) Field of Classification Search .................... 705/3, 705/8, 10, 7, 1; 707/3; 715/743, 764; 345/764
See application file for complete search history.

(56) References Cited

U.S. PATENT DOCUMENTS

| 6,268,853 | B1 * | 7/2001 | Hoskins et al. | 700/83 |
|---|---|---|---|---|
| 6,307,573 | B1 * | 10/2001 | Barros | 715/764 |
| 6,789,252 | B1 * | 9/2004 | Burke et al. | 717/100 |
| 7,036,085 | B2 * | 4/2006 | Barros | 715/764 |
| 7,076,736 | B2 * | 7/2006 | Hugh | 715/743 |
| 7,206,751 | B2 * | 4/2007 | Hack et al. | 705/7 |
| 2001/0029461 | A1 * | 10/2001 | Kobayashi | 705/8 |
| 2002/0042731 | A1 * | 4/2002 | King et al. | 705/10 |
| 2002/0049749 | A1 * | 4/2002 | Helgeson et al. | 707/3 |
| 2002/0143815 | A1 * | 10/2002 | Sather | 707/513 |
| 2002/0184067 | A1 * | 12/2002 | McLean et al. | 705/7 |
| 2003/0058277 | A1 * | 3/2003 | Bowman-Amuah | 345/765 |

OTHER PUBLICATIONS

Liberatore et al., "A framework for integrating capital budgeting analysis with strategy", Fall 1992, Engineering Economist, v38n1 pp. 31-43.*

(Continued)

*Primary Examiner*—John W. Hayes
*Assistant Examiner*—Freda A Nelson
(74) *Attorney, Agent, or Firm*—Oblon, Spivak, McClelland, Maier & Neustadt, P.C.

(57) ABSTRACT

A value chain flow diagram expresses the flow of money, things, claims, persons, information, services, values or the like related to the lifecycle of products (planning, designing, manufacturing, distribution, sale, use, disposal) which are generated among enterprises, departments of an enterprise, clients, users, stockholders, authentication organizations or regional inhabitants. In the product value chain flow diagram, individual components such as the enterprises, the departments of the enterprise, the clients, the users, the stockholders, the authentication organization or the regional inhabitants are expressed by block shapes such as boxes and circles and the flow of the money, the things, the claims, the persons, the information, the services, the values or the like is expressed by specific symbols or linear or curved arrows labeled with icons. Further, the components which are expressed by blocks are connected with each other.

6 Claims, 5 Drawing Sheets

OTHER PUBLICATIONS

Chen, Ke-Zhang, "Designing-in of high value for manufacturing in the new millineum", 2000, Integrated Manufacturing Systems, v11n6, pp. 417-427.*

Solomon, Howard "Modeling tools to help managers", Jun. 19, 1999, Computer Dealer News, 15, 24, 18 (1).*

Cisco et al. "The value added information chain", Jan. 1999, Information Management Journal, v33n1, pp. 4-15.*

Solomon, Howard, "Modeling tools to help managers", Jun. 19, 1999, Computer Dealer News, 15, 24, 18 (1).*

* cited by examiner

METHOD FOR DISPLAYING PRODUCT VALUE CHAIN FLOW DIAGRAM AND PRODUCT VALUE CHAIN DATA

BACKGROUND OF THE INVENTION

1. Field of the Invention

The present invention relates to a storage medium for storing a value chain flow diagram and product value chain data which express flows of money, things, claims, persons, information, services, values or the like which are generated among enterprises, departments of an enterprise, clients, users, stockholders, authentication organizations or regional inhabitants related to the lifecycle of products (planning, designing, manufacturing, distribution, sale, use, operation, recycling, and disposal).

2. Description of the Related Art

In a development project of any kind of product, it is important to clarify the value chains related to the project and persons or organizations having interest to the project (called "stake holder" hereinafter).

Many experts in the product development recognize that the clarification of the structure of the value chains of the clients and the stake holders is important to add high values to the products in the development of new products or new services.

However, in the present world where the global enterprise partnership and the rapid technological progress have been concurrently developed, the structure of the value chains of the clients and the stake holders becomes more complicated, while tools or techniques which can efficiently grasp the value chains among them do not exist and hence, it is often the case that a serious failure mode frequently takes place due to the lack of understanding by product developers with respect to demands of the clients or the stake holders.

The present invention has been made to solve such drawbacks and it is an object of the present invention to provide a storage medium which stores a product value chain flow diagram and product value chain data which can efficiently analyze the clients of the product, the stake holders and the structure of the value chains between the clients and the stake holders.

SUMMARY OF THE INVENTION

To achieve the above-mentioned object, according to embodiments of the present invention, a value chain flow diagram which expresses the flow of money, things, claims, persons, information, services, values or the like related to the lifecycle of products (planning, designing, manufacturing, distribution, sale, use, operation, recycling, and disposal) which is generated among enterprises, departments of an enterprise, clients, users, stockholders, authentication organizations or regional inhabitants includes a product value chain flow diagram in which individual components such as the enterprises, the departments of the enterprises, the clients, the users, the stockholders, the authentication organizations or the regional inhabitants are expressed by block shapes such as boxes and circles, the flow of the money, the things, the claims, the persons, the information, the services, the values or the like are expressed by specific symbols or linear or curved arrows labeled with icons, and the components which are expressed by blocks are connected with each other. Further, as preparation means of the product value chain flow diagram, the enterprises, the departments of the enterprise, the clients, the users, the stockholders, the authentication organizations, the regional inhabitants or the like are expressed in the form of a table in which these components are arranged both in rows and columns, and the components arranged in rows or columns are set as transmitters and the components arranged in columns or rows are set as receivers, and the money, the things, the claims, the persons, the information, the values or the like which are made to flow between respective components are filled in corresponding portions of the table so as to express the flow of the components.

DESCRIPTION OF THE PREFERRED EMBODIMENT

Figure 1:
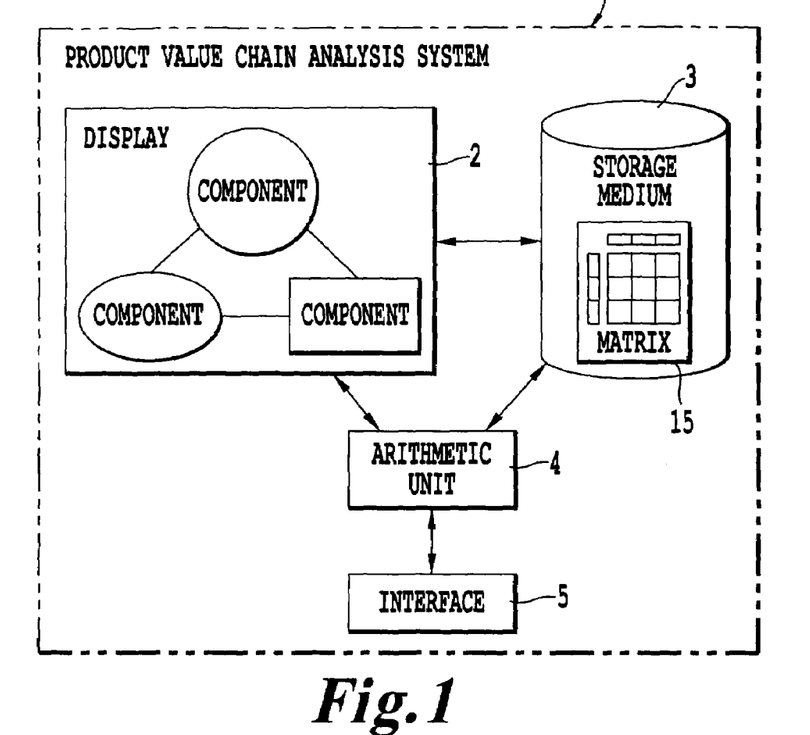
FIG. 1 is a schematic constitutional view showing an example of a storage medium which stores a product value chain flow diagram and product value chain data according to the present invention.

FIG. 1 is a schematic constitutional view showing an embodiment of a storage medium of the present invention which stores a product value chain flow diagram and product value chain data. A product value chain analysis system 1 is constituted of a display device 2, a storage medium 3 which stores the product value chain data, an arithmetic unit 4 and an interface 5 shown in the product value chain flow diagram.

Figure 2:
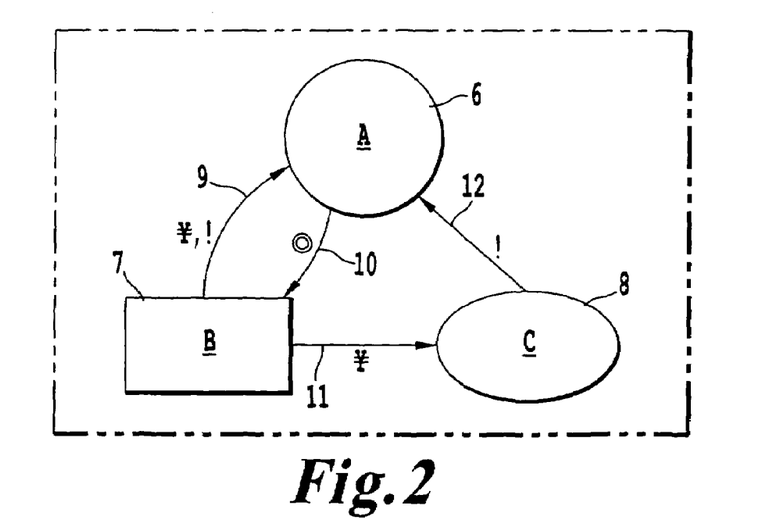
FIG. 2 is a view showing a first example of the product value chain flow diagram showing a content displayed by a display device in the product value chain flow diagram of FIG. 1 in an enlarged form.

FIG. 2 is a first example of the product value chain flow diagram which shows a content displayed on the display device 2 of the product value chain flow diagram shown in FIG. 1 in an enlarged form. In this drawing, components such as enterprises, clients or stake holders which are related to a product which constitutes an object are respectively displayed by circles, boxes or oblong circles 6-8 and flow elements such as money, things, claims, persons, information, services, values or the like which are generated between respective components are connected to each other by means of arrows 9-12. Labels having specific symbols or icons are fixed to arrows 9-12 corresponding to the contents of the flow elements.

In the example shown in FIG. 2, symbols [¥], [!] and [%] respectively indicate the money, the claim and the product. In this example, the flow of product is generated from the component A to the component B and the flow of money and claim is generated from the component B to the component A. That is, this example is directed to the structure of value chain in which the component A sells the product to the component B and the component B pays for the product to the component A and also makes the claim with respect to the product. In the same manner, the flow of money is generated from the component B to the component C and the flow of claim is generated from the component C to the component A.

Figure 3:
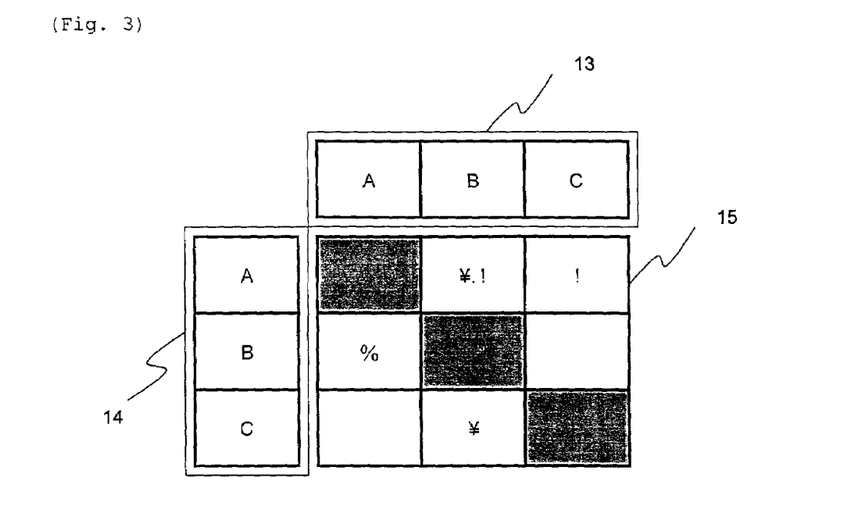
FIG. 3 is a view showing a first example of a data constitutional view showing a content of a recording medium which stores the product value chain data.

FIG. 3 shows a first example of an input data constitutional view showing a content of the storage medium 3 which stores the product value chain data. In this embodiment, the components A-C such as enterprises, departments of an enterprise, clients, users, stockholders, authentication organizations or regional inhabitants or the like are filled in the storage medium 3 in the longitudinal direction as well as in the lateral direction. In this example, items filled in the lateral direction in an upper stage describe the components 13 indicative of transmitters and items filled in the longitudinal direction at the left column describe the components 14 indicative of receivers. The value chains among respective components are expressed by a matrix 15 in which flow elements are filled. In this embodiment, [%] is described in the first column, the second row of the matrix 15. This indicates that the flow of product which is expressed by the symbol [%] is generated from the component A to the component B. In the same manner, [¥, !] is described in the second column, the first row of the matrix 15 and this implies that the flow of money indicated by [¥] and the flow of claim indicated by [!] are generated from the component B to the component A. Besides the above, the flow of money is generated from the component B to the component C or the flow of claim is generated from the component C to the component A.

That is, FIG. 3 expresses the product value chains completely identical to those shown in FIG. 2 in a different expression form. The data constitution shown in FIG. 3 can be simply prepared by making use of a generally-used software such as a spread sheet.

Although the items filled in the lateral direction in the upper stage are set as the components which express the transmitters and the items filled in the longitudinal direction in the left column are set as components which express the receivers, the relationship between the transmitters and the receivers may be made inverse such that the transmitters may be expressed in the column direction and the receivers may be expressed in the row direction.

Figure 4:
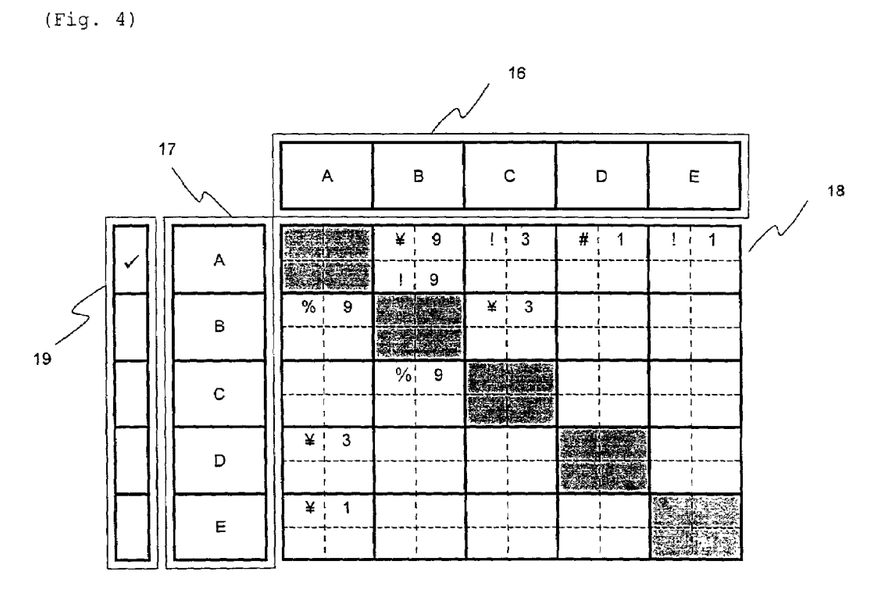
FIG. 4 is a view showing a second example of a data constitutional view showing a content of a recording medium which stores the product value chain data.

FIG. 4 is a second example of the data constitutional view showing the content of the storage medium which stores the product value chain data of FIG. 1 and is an example which is more complicated than the example shown in FIG. 3. In this example also, the components which express the enterprises, the departments of the enterprise, the clients, the users, the stockholders, the authentication organizations, the regional inhabitants or the like are described in the row and the column of the table and the components described in the upper row constitute the transmitters and the components described in the left column constitute the receivers. What make the example shown in FIG. 4 different from the example shown in FIG. 3 are following four points.

(1) The number of components is increased from 3 to 5.

(2) Besides symbols expressing [money](¥), [things](%) [claims](!), a symbol (#) which expresses [authorization] is added.

(3) Numeral which indicates the magnitude of the flow is described at a lateral side parallel to the symbol of the flow element.

(4) A mark is given to the component which is arranged at the center of the product value flow diagram (A in this example)

Figure 5:
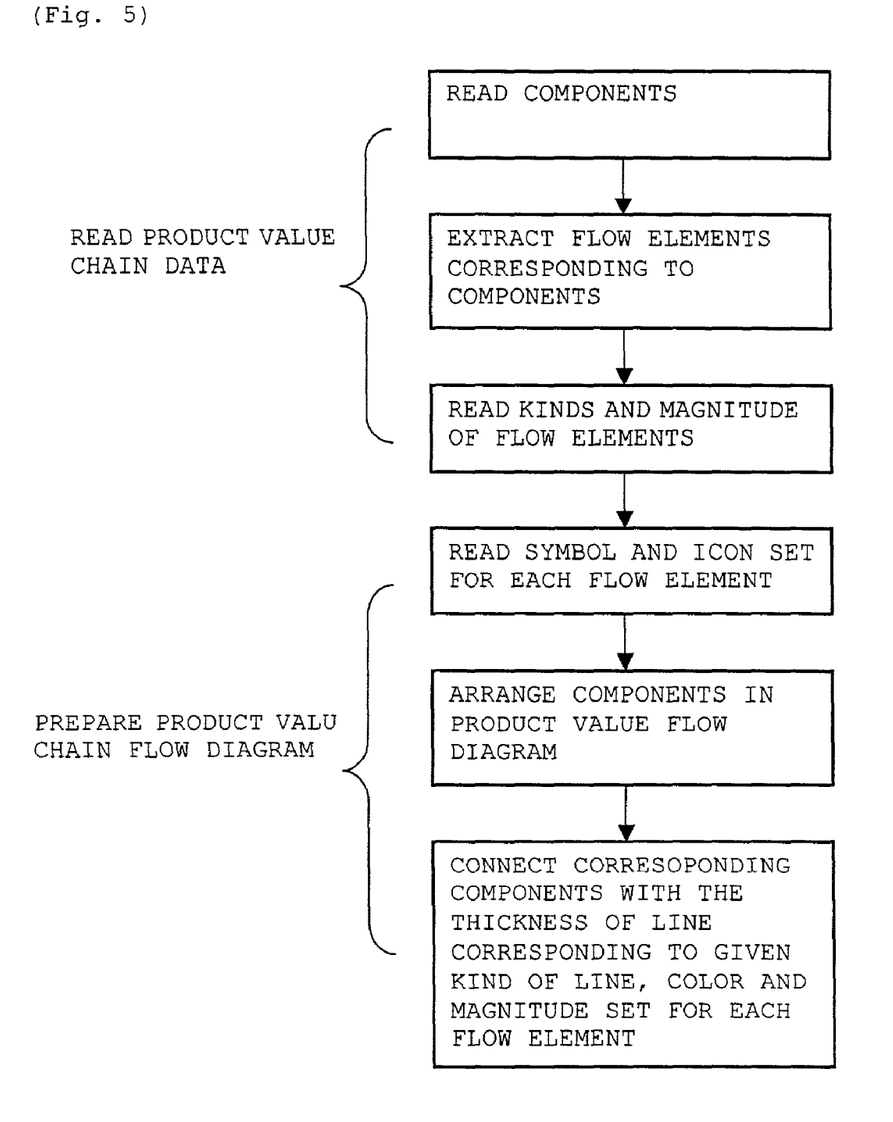
FIG. 5 is a flow chart for automatically preparing a product value chain flow diagram from inputted product value chain data.
Figure 6:
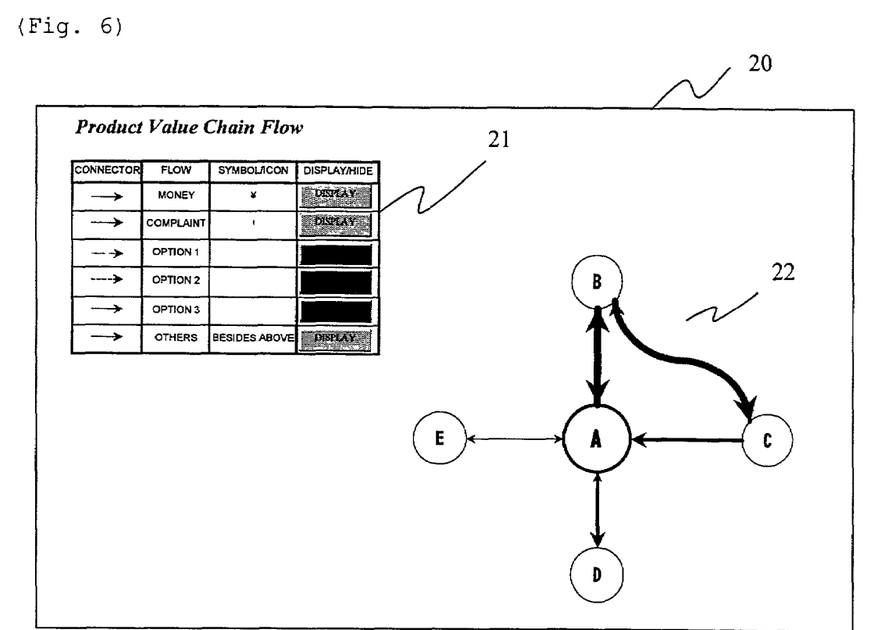
FIG. 6 is a product value chain flow diagram which is automatically prepared.

FIG. 5 is a flow chart for automatically preparing the product value chain flow diagram based on the product value chain data inputted in a form described in FIG. 4 and FIG. 6 is an automatically prepared product value chain flow diagram using a generally available spread sheet.

To automatically prepare the product value chain flow diagram based on the product value chain data inputted in the form shown in FIG. 4, first of all, the components which are to be described in the product value chain flow diagram are read from the components 16 indicative of the upper-stage transmitters of FIG. 4 or components 17 indicative of the left-end receivers. Subsequently, the flow elements which are generated between respective components are extracted from the matrix 18 of FIG. 4 and the kinds and the magnitude of all flow elements are read.

In the example shown in FIG. 4, there exist four kinds of flow elements %, ¥, !, #. Although the magnitude of the flow elements is indicated by integer values made of 1, 3, 9, the magnitude may be indicated by the numerals such as the number of products, amount of money, the number of claims or the like.

Subsequently, symbols and icons which are preliminarily set for respective flow elements are read. With respect to the flow elements which are described in the usual product value chain and the flow elements which have to be inevitably taken into consideration, it is convenient to set these values in advance. Although it will be explained in detail later, here, as indicated by numeral 21 in FIG. 6, kinds of lines and colors of arrows used with respect to ¥ (money), ! (claims) are preliminarily set.

The product value chain flow diagram is prepared based on the read data. In FIG. 6, five components A-E are indicated by circular blocks, wherein the component A is arranged at the center and other four components B-E are concentrically arranged about the component A as the center. The arrows showing the flow elements are described with the thickness of line corresponding to the kinds of lines, colors and the magnitudes of flows corresponding to the present symbols and icons and connect the components to each other. Each arrow is not described independently from the components. That is, since a starting point and an end point are defined as figure or device objects associated with blocks of corresponding components, when the block of the component is moved on a display screen, the arrows are moved in an interlocking manner with the block of the component so that the connection can be maintained.

In performing the automatic depicting, a problem that the arrows are superposed depending on the arrangement of the components and the number of flow elements and the like arises. However, it is possible to edit the product value chain flow diagram for facilitating the visibility of the diagram. Further, although the kinds of lines and colors corresponding to the money (¥) and the claims (!) are preliminarily defined as the flow elements and default kinds of lines and colors are used with respect to other flow elements, if there exist any other flow elements to be specified, they can be defined separately.

Figure 7:
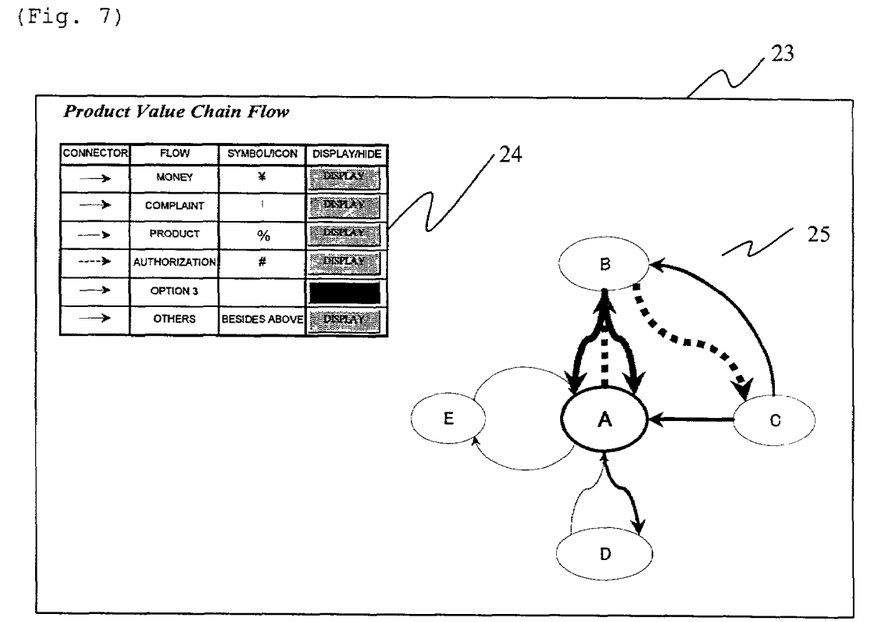
FIG. 7 is a product value chain flow diagram as a result of editing.

FIG. 7 is a product value chain flow diagram which is obtained as the result of editing the flow diagram shown in FIG. 6 using such an editing function. Although FIG. 7 basically expresses the product value chains identical to those of FIG. 6, the arrangement and the shapes of the components and the flow elements are edited to enhance the visibility. Further, in FIG. 7, the product (%) and the authorization (#) are defined as new flow elements and kinds of line and colors of arrows corresponding to them are also defined.

In this manner, the fact that the product value chain flow diagram which is automatically prepared can be edited with a simple manipulation constitutes a large feature of the present invention. In the case that it is desirable to take a large kinds of flow elements into consideration by classifying them depending on products as objects, the flow elements are newly defined and the kinds of lines and colors of corresponding arrows can be set. Further, in the case that components other than the components which are originally assumed are to be added, rows and columns are newly added to the product value chain data shown in FIG. 4 and the value chains between the newly added components and existing components are inputted. This can be reflected on the product value chain flow diagram.

Further, it is possible to change the arrangement of the components or to focus and display only the specified flow elements.

Figure 8:
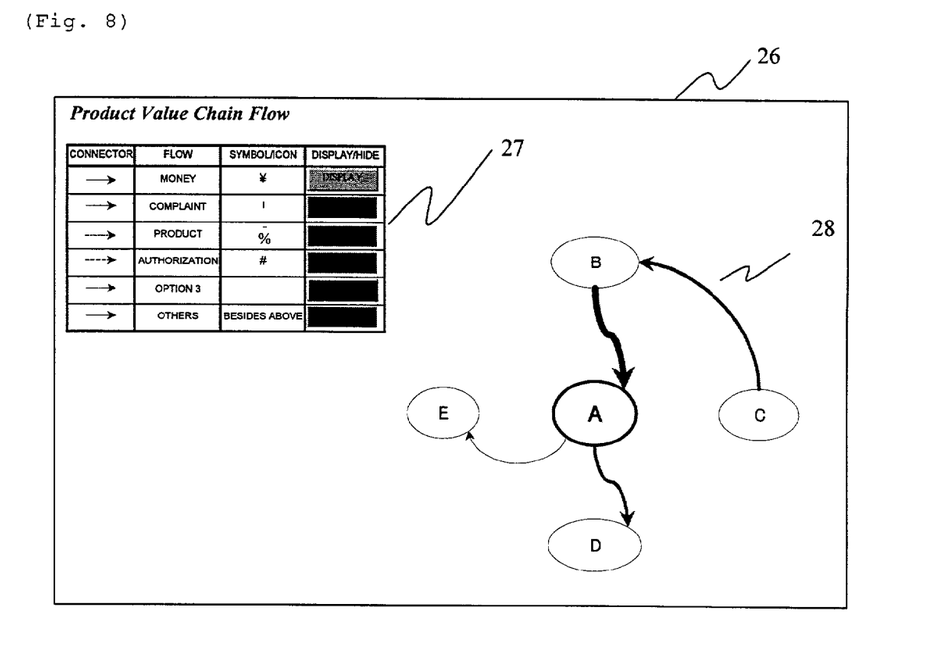
FIG. 8 and FIG. 9 are examples of product value chain flow diagrams being depicted based on different display methods.
Figure 9:
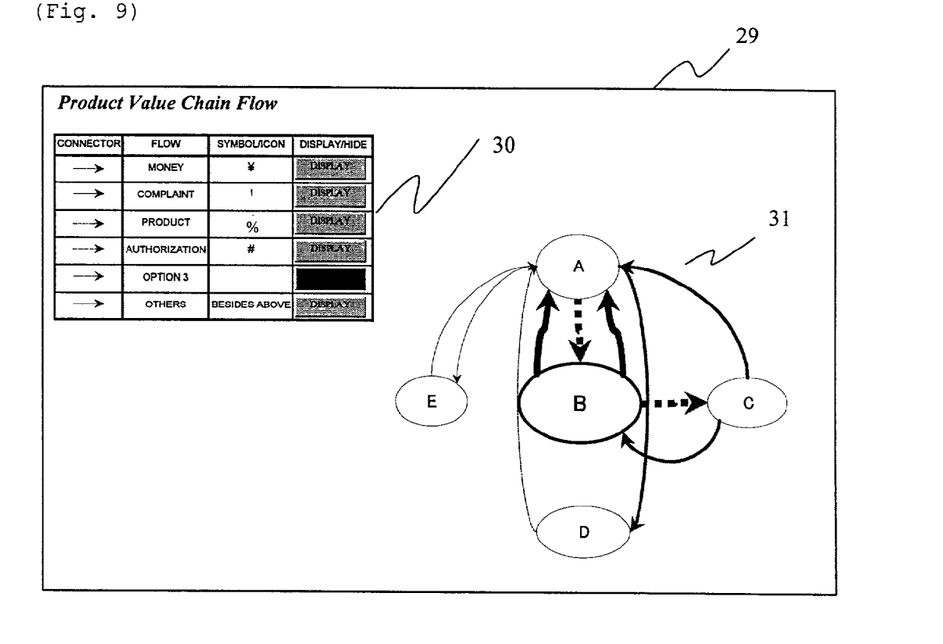

FIG. 8 and FIG. 9 show examples of product value chain flow diagrams depicted by different display techniques.

FIG. 8 shows an example in which, in the product value chain flow diagram of FIG. 7, only the flow of money is displayed and other flow elements are not displayed. Since figure or device objects indicative of the flow elements are labeled with specified symbols and icons, it becomes possible to manipulate each flow element. This is particularly effective when the product value chains become complicated.

FIG. 9 shows an example which depicts a product value chain flow diagram with the component B arranged at the center. By designating the component which is desired to be arranged at the center in the product value chain data, the rearrangement becomes possible. Although the component A in the data portion 19 indicating the component arranged at the center is inputted with a checked mark in FIG. 4, the rearrangement becomes possible by changing the arrangement A to the component B. Such a change of arrangement is effective to grasp the product value flow diagram visually. For example, it is effective in the case that the product value chains which were considered by setting the own company or own department at the center of the chain flow program is to be reviewed from a stand point of the clients.

According to the storage medium of the present invention which stores the product value chain flow diagram and the the product value chain data, in a development project of the product, the flow of the money, the things, the claims, the persons, the information, the services, the values or the like which are generated between the enterprises, the departments of the enterprise, the clients, the users, the stockholders, the authentication organizations, the regional inhabitants or the like which are relevant to each other can be expressed individually or simultaneously and simply so that the difference between the flow of money and the flow of claims or the difference between the flow of things and the flow of money can be recognized. Further, since the expressed result can be easily displayed, the understanding of the value structure of the clients and of the stake holders by the product developer can be facilitated and this helps to promote the development of genuinely highly valuable product. Further, the analysis of the current or up-to-date value structure will lead to the discovery of a new value creation.

We claim:

1. A method of displaying a product value chain, comprising:

displaying a product value chain diagram including a plurality of components and flow elements representing flows between the components, the components representing enterprises, clients or stakeholders which are related to a product, the flow elements including at least a flow of money relating to the product and a claim raised by one of the components, each of the flow of money and the flow of the claim flowing between one of the components to another;

storing product value chain data for generating the product value chain diagram;

additionally displaying the product value chain data in a matrix having components as transmitters for the flows in one of row and column and having components as receivers for the flows in another of the row and the column, and the flow elements are filled in elements of the matrix;

processing the product value chain data to generate the product value chain diagram to be displayed; and editing the matrix displayed by a display device, wherein arrangements and shapes of the components and the flows of the product value chain diagram are changed based on the edits to the matrix, wherein the components are displayed as circles, boxes or oblong circles and the flow elements are displayed as arrows connecting the components on the display device, and flow elements of different kinds are displayed differently.

2. The method of claim 1, wherein the flow elements of different kinds are displayed as arrows with different colors or lines.

3. The method of claim 2, wherein the flow elements of different kinds are displayed and accompanied with labels having different symbols or icons.

4. The method of claim 3, wherein the product value chain flow diagram is displayed in correspondence to flow elements of the product value chain data.

5. The method of claim 4, wherein each of the flow elements is shown in the matrix with an indication of whether or not to display the corresponding flow element.

6. The method of claim 5, wherein the product value chain diagram is displayed with only flow elements that are indicated to be displayed and other flow elements are not displayed.

* * * * *

UNITED STATES PATENT AND TRADEMARK OFFICE
CERTIFICATE OF CORRECTION

PATENT NO.       : 7,383,192 B2
APPLICATION NO.  : 09/953293
DATED            : June 3, 2008
INVENTOR(S)      : Sekimoto et al.

It is certified that error appears in the above-identified patent and that said Letters Patent is hereby corrected as shown below:

On the title page, Item (75), the inventor information is incorrect. Item (75) should read:

Item -- (75) Inventors:  Shinya Sekimoto, Tokyo (JP); Hiroshi Yamazaki, Kanagawa-ken (JP); Kyoko Suzuki, Tokyo (JP); Kosuke Ishii, California (US) --

Signed and Sealed this

Fifth Day of August, 2008

JON W. DUDAS
*Director of the United States Patent and Trademark Office*